June 19, 1951

A. J. HORNFECK 2,557,824

ELECTRIC MOTOR CONTROL SYSTEM

Filed March 31, 1945

Inventor
ANTHONY J. HORNFECK

Raymond D. Jenkins
Attorney

June 19, 1951     A. J. HORNFECK     2,557,824
ELECTRIC MOTOR CONTROL SYSTEM Filed March 31, 1945     6 Sheets-Sheet 2

INVENTOR.
ANTHONY J. HORNFECK
BY
Raymond D. Junkin
ATTORNEY

June 19, 1951  A. J. HORNFECK  2,557,824
ELECTRIC MOTOR CONTROL SYSTEM
Filed March 31, 1945  6 Sheets-Sheet 3

*INVENTOR.*
ANTHONY J. HORNFECK
BY
Raymond W. Jenkins
*ATTORNEY*

June 19, 1951  A. J. HORNFECK  2,557,824
ELECTRIC MOTOR CONTROL SYSTEM
Filed March 31, 1945  6 Sheets-Sheet 5

Inventor
ANTHONY J. HORNFECK
By Raymond W. Jenkins
Attorney

June 19, 1951 A. J. HORNFECK 2,557,824
ELECTRIC MOTOR CONTROL SYSTEM
Filed March 31, 1945 6 Sheets-Sheet 6

INVENTOR.
ANTHONY J. HORNFECK
BY Raymond W. Junkins
ATTORNEY

Patented June 19, 1951

2,557,824

UNITED STATES PATENT OFFICE 2,557,824

ELECTRIC MOTOR CONTROL SYSTEM

Anthony J. Hornfeck, Cleveland Heights, Ohio, assignor to Bailey Meter Company, a corporation of Delaware Application March 31, 1945, Serial No. 585,891

18 Claims. (Cl. 318—345)

This invention relates to measuring and controlling systems and apparatus, and more particularly to electrical circuits for motors and other controlling means used in connection with contour control or duplicators for machine tools such as lathes, shapers, planers, milling machines, die sinking machines, and the like. It is, of course, to be understood that my invention is not limited to use with contour control for machine tools, but finds ready application in many other embodiments.

An object of my invention is to provide a contour control wherein a desired contour or shape is accurately produced on a work piece, thereafter requiring a minimum of hand finishing.

Still another object of my invention is to provide a contour control for a duplicator which may be readily applied to a wide variety of machine tools or material working machines.

A further object is to provide improved electrical circuits for motors and other controlling apparatus sensitive to minute forces or movements.

Further objects will be apparent from the description and drawings in which.

As is well understood by those familiar with the art, in some machine tools, such as lathes, the tool is moved longitudinally and transversely of the work piece which, except for rotation about its center, remains stationary. In other machine tools, such as some types of milling machines, the work piece may be moved in two directions while the tool, except for rotation about its axis, remains stationary. In some other types of milling machines and in some die sinking machines the tool may be moved in one, two or three directions and the work piece may also be moved in one or more directions. In all instances it will be observed, however, that it is the relative movement between the tool and work piece that causes the work piece to be formed to a desired shape. As one specific embodiment of my invention, I have chosen to illustrate and describe the invention incorporated in a lathe wherein the work piece, except for rotation about its center, remains stationary and the tool is moved transversely and longitudinally thereof. As another specific embodiment of my invention I have illustrated its application to a milling machine wherein the tool, except for rotation about its center, remains stationary and the work piece is moved in two directions in order that the tool may cut the work piece to a desired shape. It will thus be evident that my invention is applicable to a wide variety of machine tools, and that when I speak of relative movement between the tool and work piece I include either an arrangement where the tool is stationary and the work piece moved, or the work piece is stationary and the tool is moved, or a combination of the two.

Throughout the specification and claims to follow I indicate that the work piece is formed to correspond to the profile or shape of a master. By such language I do not intend to imply that the work piece is brought to the exact shape of the master, but as will be evident to those familiar with the art, the master will be formed so that the ultimate shape of the work piece produced is that desired, and that therefore the shape of the work piece may differ from that of the master by the amount of angularity, etc., in the mechanism. Furthermore, I use the terms contour, profile, shape, and the like, in a broad sense and not with any limiting distinction between the profile of a two dimensional silhouette or the surface configuration of a body, for example. In general, the pattern or cam dictates the desired shape of the work piece. I use profile and contour interchangeably. The pattern has the desired shape, although not necessarily the exact shape.

By strict definition one might be led to believe that profile is only the edge shape of a two-dimensional silhouette for example. Usually, it is spoken of as the edge shape of a thin plate template, although such a template is a three-dimensional object. Usually contour is the surface configuration, or at least of a portion of the surface of a three-dimensional object. I intend to make it clear that in speaking of profile or contour I mean the forming of a work piece to a shape as dictated by that of a template or pattern and without any specific or limiting meaning being given to the terms profile and contour.

The pattern or template has a shape corresponding to the desired path of movement of the tool to produce the desired finished work piece. By "corresponding" is meant that not only is the pattern or template the same shape as the desired work piece, either in greater or smaller proportion thereto, but also that the pattern or template is in any desired distorted shape to compensate for characteristics of the machine. While the pattern or template must correspond to the desired work piece, it is not necessarily identical in contour, and therefore the term "correspond" implies that the pattern or template is purposely designed to result in the desired contour of the work piece to be produced. This application is a parent application of my two divisional applications entitled "Saturable Reactor Phase Shifter" application Serial No. 145,992 filed February 24, 1950, and "Dual Bridge Motor Control Circuit" application Serial No. 145,991 filed February 24, 1950.

Figure 1:
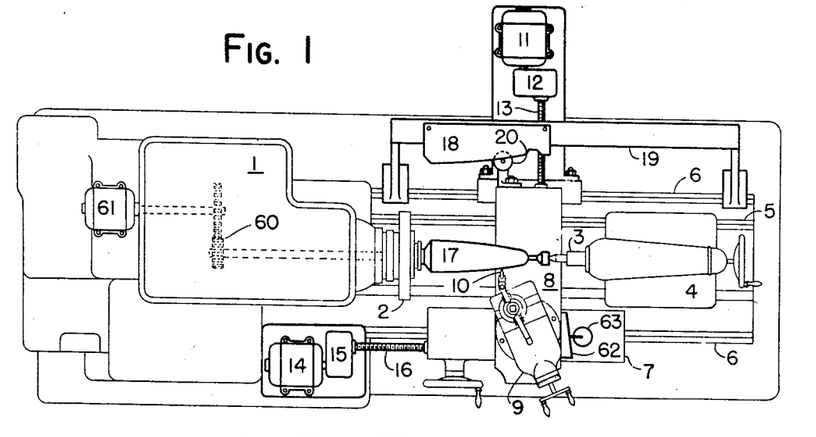
Fig. 1 is a plan view of a lathe embodying a contour control system.

Referring to Fig. 1, I show my invention applied to an engine lathe 1 having a head stock 2 adapted to be rotated at desired speed by any suitable means 61 and having a tail stock 3. A carriage 4 is movable longitudinally along the bed of the lathe on suitable ways 5 and supports the tail stock 3. Also movable longitudinally along the bed of the lathe on suitable ways 6 is a carriage 7. Mounted on the carriage 7 is a cross-slide 8 movable on ways transversely of the bed of the lathe.

The cross-slide 8 is provided with an adjustable tool support 9 in which is secured a tool 10. An electric motor 11 drives, through the necessary gear reduction 12, a worm or screw 13 for positioning the cross-slide 8 and tool 10 transversely of the bed of the lathe. Longitudinal movements of the tool 10, that is, movements of the tool parallel to the center line of the lathe, are produced by means of a motor 14 operating a lead screw 16 through the intermediary of a gear reduction 15.

Supported by the head stock 2 and tail stock 3 is a work piece 17, which for illustrative purposes is shown as being formed to a parabolic shape by the tool 10. The particular shape has no significance, it being apparent as the description proceeds that by my invention a work piece may be formed automatically to any desired contour or shape. A master template or cam 18 is rigidly held in parallelism to the work piece 17 upon any convenient extension 19 of the lathe bed. The profile of the master 18 is the contour which it is desired to reproduce upon the work piece 17. In Fig. 1 the taper of the work piece 17 follows in general a parabolic function merely as an example. For contacting and following the profile of the master template 18 I provide a tracer assembly 20 rigidly mounted on and movable with the cross-slide 8. The assembly 20 is shown in larger diagrammatic fashion in Fig. 2 as having a body member or envelope 21 which is firmly mounted to the cross-slide 8 and a tracer arm 22 carried by a flexible diaphragm 23 forming a part of the enclosure 21.

Figures 2, 3, 4:
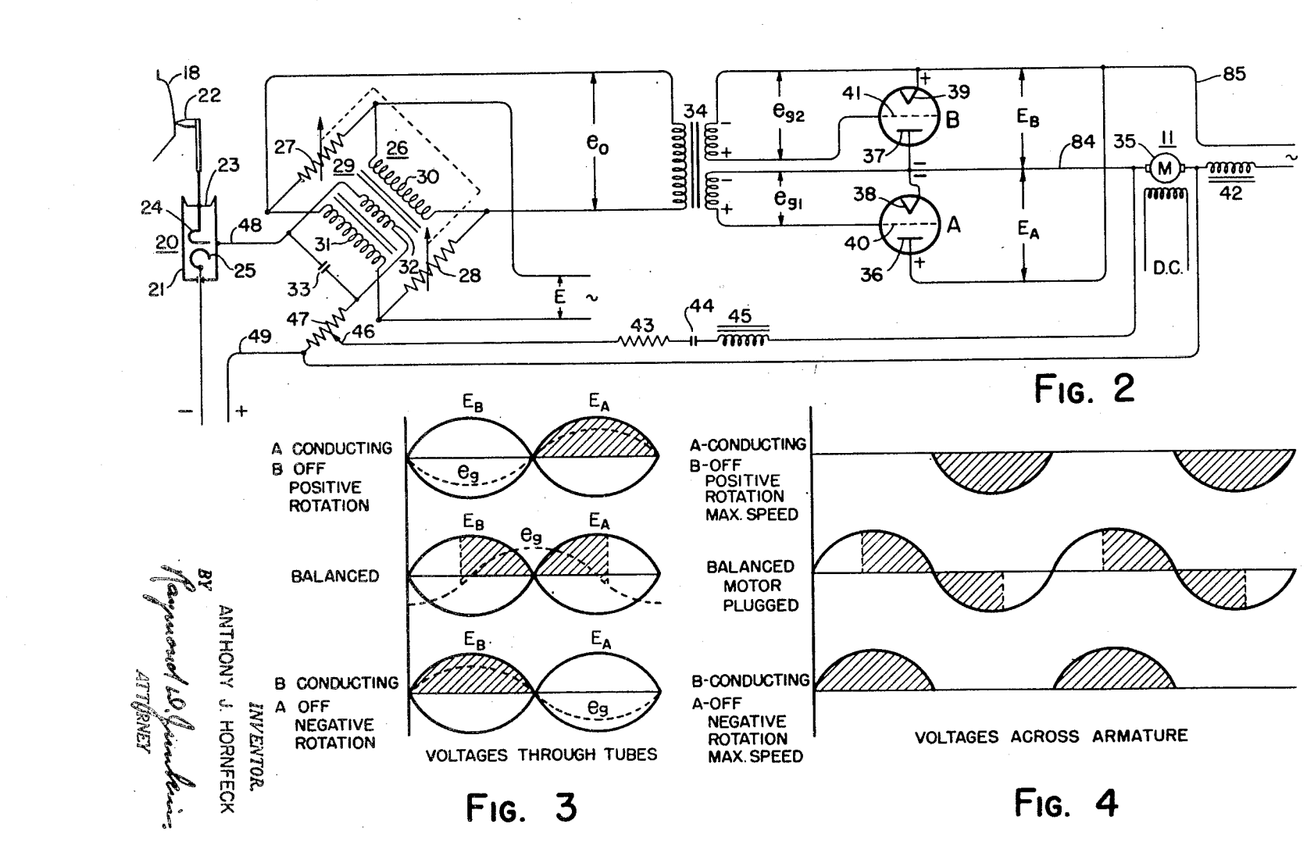
Fig. 2 is an electric circuit diagram of the transverse motor control of Fig. 1.
Fig. 3 is a plot of voltage conditions in tubes A and B of Fig. 2.
Fig. 4 is a plot of voltage conditions through the armature of motor 11 in Fig. 2.

The tracer assembly 20 constitutes an electron discharge device, preferably a 2-element tube having a movable anode 24 and a heated cathode 25. The envelope 21, of which the diaphragm 23 forms a part, may be of metal or of glass, but preferably of metal for strength. It is preferably of such shape and construction that the diaphragm 23 will flex to allow movement of the anode 24 within the envelope 21 as a result of positioning the tracer 22 through means external to the envelope, such as engagement of the tracer 22 with the edge of the master template 18.

Such an electron discharge device or tube is preferably a high vacuum tube of the regulating type wherein the effective electron emitting or electron receiving areas of the electrodes are varied without necessarily changing the distance between the electrodes, as shown and described in the patent to McArthur 2,142,857. I have shown the tube in quite diagrammatic fashion as being sufficient for the present disclosure. Movement of the anode 24 relative to the cathode 25 causes a change in magnitude of the electric current which flows through the device, and while the tube is not of the start-stop grid control type, nevertheless movement of the anode away from the cathode in sufficient extent may reduce the current passage to zero.

In Fig. 2 I have not only shown the tracer assembly 20 to larger diagrammatic scale, but have shown the complete electrical circuit for controlling the motor 11 by the tracer arm 22 in such manner that the motor 11 will position the cross-slide 8 and consequently the tool 10 transversely of the lathe, or in other words toward or away from the work piece 17 as the tool 10 is traveled longitudinally. The action is such that if the contacted edge of the master template 18 is a straight line parallel to the axis of the work piece 17, then the work piece 17 would be turned to cylindrical form. If the contacted edge of the master 18 is a straight line, but inclined relative to the axis of the work piece 17, then the work piece 17 will be shaped to a taper. The particular showing of Fig. 1 is in general a parabolic curve on the contacted edge of the master 18, and thus the form to be produced on the work piece 17.

Referring now in particular to Fig. 2, I will describe the electrical control circuit whereby the direction and speed of rotation of the motor 11 is controlled by the inter-action of tracer arm 22 with the template 18. In general the arrangement of Fig. 2 provides a phase sensitive bridge or network 26 controlling the motor 11 through the agency of electron discharge devices A and B. The description is premised on ideal electrical circuit conditions, and for simplicity the motor control circuit will be described under conditions of full speed rotation of the motor in either direction, or under a balanced condition of no rotation. It will be apparent to those skilled in the art, as the description proceeds, how variable speed of rotation of the motor in either direction is accomplished between the limits of maximum speed of rotation and zero speed.

In Fig. 3 I have plotted voltage values through the tubes A and B for zero rotation and for full speed motor rotation in either direction. In Fig. 4 I have similarly plotted voltages across the armature of the motor 11 under the same operating conditions. Description will now be had with reference to Figs. 2, 3 and 4.

The phase sensitive bridge 26 is an alternating current bridge having a source of alternating current supply whose voltage is designated as E. The bridge comprises opposite resistance legs 27, 28 simultaneously hand adjusted as illustrated. The remaining two legs 30 and 31 of the bridge are reactive legs whose reactance is equal to each other and to the resistance of the legs 27, 28. With such a bridge the output voltage $e_0$ is 90 degrees out of phase with the bridge A.-C. supply E.

The two reactive legs 30, 31 form alternating current windings of a saturable core reactor 29 having a direct current saturating winding 32, shunted by a capacitor 33, and joining a direct current power source through the electron device 20. Thus positioning of the anode 24 relative to the cathode 25 (of the device 20), through the inter-action of tracer 22 with template 18, varies the direct current applied to the saturating winding 32, and thus varies the reactance or impedance to alternating current flow through the bridge legs 30, 31.

The network is normally biased so that some D.-C. is flowing through the winding 32, but not enough to result in motor rotation. Such a "neutral" condition exists when the tracer arm 22 is slightly biased in a clockwise direction (Fig. 2) by pressure against the template 18. From such position a rise or recession of the shape of the template encountered will cause a deflection of arm 22 further clockwise or in a counterclockwise direction respectively. This will result in a variation in the amount of direct current flowing through the saturating winding 32, and will result in shifting of the phase of the bridge output voltage $e_0$ in one direction or the other relative to the phase of the bridge supply voltage E, and in degree dependent upon the amount of direct current flow (relative to the neutral value) through the saturating winding 32 and correspondingly upon the direction and amount of deflection of the arm 22.

Control tubes A and B are connected back to back with their grids in phase, but the plates 180 degrees out of phase. The grid voltages $e_{g1}$ and $e_{g2}$ are (as shown) equal and in phase; the grid transformer 34 serving to separate and insulate the grid circuits of the tubes A and B.

At balance, i. e. with the motor stationary, the grid voltage $e_g$ is 90 degrees out of phase with tubes A and B. For example, it is plus 90 degrees with reference to A and minus 90 degrees with reference to B. This is shown in the "balanced" graph of Fig. 3. Voltage conditions through the armature 35 of motor 11 are shown in the "balanced" graph of Fig. 4, wherein actually the armature receives equal alternate voltages of opposite polarity to effectively plug it against rotation. The curves of Figs. 3 and 4 are plotted on theoretical ideal values for explanatory purposes only. Actually the armature voltage will be distorted by inductance.

The value of $e_0$, and consequently of $e_g$, remains substantially constant under the assumed ideal condition of maximum tube conductance. The phase of $e_0$ however is capable of being shifted by the bridge until $e_g$ is completely in phase with tube A for full speed motor rotation in one direction, or completely in phase with tube B for full speed motor rotation in the opposite direction. The first condition is shown in the upper graph of Fig. 3, while the upper graph of Fig. 4 shows the armature receiving pulsating direct current of one sign. The condition for full speed reverse direction rotation is shown in the lower graphs of Figs. 3 and 4.

The electron discharge devices A and B are indicated as having plate anodes 36 and 37, control grids 40 and 41, and heated filament cathodes 38 and 39 respectively. The cathode 38 of tube A is connected to the anode 37 of tube B, while the anode 36 of tube A is connected to the cathode 39 of tube B.

Inasmuch as I supply both the grid and the plate of each tube with an alternating current, the phase relation between the grid and plate voltage determines the point in the wave at which current begins to pass in each cycle; hence the average amount of current passing through the valve. Current can pass through a valve in only one direction, and inasmuch as the two valves A and B are oppositely connected in parallel in the alternating current circuit shown, each valve will pass one-half of the alternating current wave. I may vary the amount of current passing through each valve by causing a shifting of the phase of the grid voltage relative to the plate voltage, which is accomplished as previously mentioned by the phase shifting bridge or network 26.

As mentioned, the grids of the two tubes A and B are in phase, but the plates are out of phase by 180 degrees. Voltages $e_{g1}$ and $e_{g2}$ are always equal, so that the tubes are both conducting during one-half cycle in the neutral condition. During one-half cycle the grid is in phase with the plate of each tube, and therefore an alternating current plate current is flowing through the motor. This current flow through the tubes A and B is illustrated by the shaded sectioning on the "Balanced" graph of Fig. 3, and on the "Balanced" graph of Fig. 4 is illustrated by the shaded portions the voltages across the armature 35. In Fig. 3 both shaded sections are above the line as current flows through the tubes in the same direction. However, the voltage through the armature 35 is positive from one tube and negative from the other as illustrated in Fig. 4, and thus in the neutral or balanced condition the motor is plugged because alternate half cycles are in opposite direction.

With reference to the bridge, under one condition of unbalance there is an increase in direct current flow and under the other condition of unbalance there is a decrease of direct current flow, and this causes an unbalance of the circuit in one direction or the other, or a shifting of phase in the output bridge voltage $e_0$ relative to the supply voltage E. Unbalance, for example an increase, in direct current flowing through the saturating winding 32, reduces the impedance of bridge legs 30 and 31. They become unbalanced relative to legs 27 and 28, which makes the reactance less than the resistance. This shift in phase of $e_0$ is above or below 90 degrees out of relation with E. As the grid voltage swings for an increase or decrease, toward the right or toward the left, it tends to bring it nearer in phase with tube A (or B) or nearer 180 degrees out of phase with B (or A). If A is fully conducting (and B is off) the motor runs in one direction on pulsating D.-C. smoothed out by the choke 42.

In Fig. 2 I have illustrated a feed back circuit including a resistance 43, a capacitor 44, and a reactance 45, connected in series across the armature 35. Further, in the series group is a portion of a resistor 47 as determined by the position of a contact arm 46 manually adjustable. The effective direct current voltage across the armature 35 is a measure of its speed of rotation, and therefore the rate of change of voltage is a measure of rate of change in speed. This gives a voltage in the feed back circuit only when speed is changing and opposing the input during change in speed. That is, it adds going up and subtracts going down. The result is that with the feed back voltage adding, upon an acceleration the motor speeds up or tends to overcome its inertia, and in coming down it bucks and tends to slow it down faster so that the motor does not overtravel. This effect has been plotted in Fig. 5.

From the preceding description it will be apparent that the speed and direction of rotation of the motor 11 is under the control of the tracer assembly 20 and specifically of the interrelation between the tracer arm 22 and the template 18.

Referring again to Fig. 1, assume that the motor 14 is being operated at a uniform speed of rotation in direction such that the cross-slide 8 and tool 10 are being traveled at a uniform speed from right to left along the work piece 17, and at the same time the tracer assembly 20 is being traveled from right to left along the template 18. The adjustment is such that the tracer arm 22 is slightly pressed against the edge of the template 18. Under this bias condition the motor 11 is plugged and no transverse movement of the tool 10 or of the tracer assembly 20 is had. This is the condition that would exist if the contacted edge of the template 18 is a straight line parallel to the axis of the work piece 17 and would result in the turning of the work piece 17 to a cylindrical form.

If, as the tracer assembly 20 continues to move toward the left, it encounters a change in shape of the template 18 whereby (referring to Fig. 2) the tracer arm 22 is deflected in either a clockwise or counterclockwise direction relative to the envelope 21, then the direct current passage through the device 20, and consequently through the saturating winding 32, will be either increased or decreased (depending upon the direction of deflection) with consequent rotation of the motor armature 35 in proper direction to position both the tool 10 and tracer housing 21 transversely relative to the work piece 17. This provides a follow-up on the tracer assembly whereby the envelope 21 is positioned in the same direction to the movement of the tracer arm 22 to follow up and tend to return the current flow through saturating winding 32 to the neutral value.

For example, if (referring to Fig. 1) the edge of the template 18 is increasing in distance from the center line of the work 17, then the tracer arm 22 will be continually moved relative to the envelope 21 in direction to cause the motor to keep backing the tool 10 away from the center line of the work 17, and thus produce an increasing diameter of the work piece 17 as the tool moves toward the left. As previously mentioned, the motor 11 is controlled not only as to direction of rotation, but also as to speed of rotation, dependent upon the magnitude of departure of the contacted edge of template 18 from a straight line parallel to the axis of work piece 17.

In describing the operation of the motor 11 for transverse movement of the tool 10 and tracer assembly 20 I have so far assumed that the motor 14 runs in one direction at a uniform speed, thus traveling the carriage 7 longitudinally of the work piece at a uniform speed from right to left. Preferably the tracer assembly 20 also controls speed of rotation of the motor 14 and thereby the speed of longitudinal travel of the tool along the work piece. The need for such control is known to those skilled in the art. If the contacted edge of the template 18 approaches or recedes from the center line of the work piece 17 (as demanding a taper) the longitudinal speed of travel of the tool 10 should be reduced in proportion to the steepness of the desired taper. For example, as an extreme, if the tracer arm 22 reaches a shoulder on the edge of the template 18, normal to the axis of the work piece, it is necessary to completely stop longitudinal travel of the tool 10 while the tool moves toward or away from the center of the work piece in transverse direction for finishing such a shoulder. Thus in general as the tool (under the guidance of the tracer) moves in either direction transversely of the work piece the longitudinal speed of travel of the tool is reduced from a maximum. When turning the work piece to cylindrical form, i. e. with no movement of the tool transversely of the work piece, then longitudinal speed of travel of the tool is at maximum. This I term a "neutral" condition.

Figures 5, 6, 8:
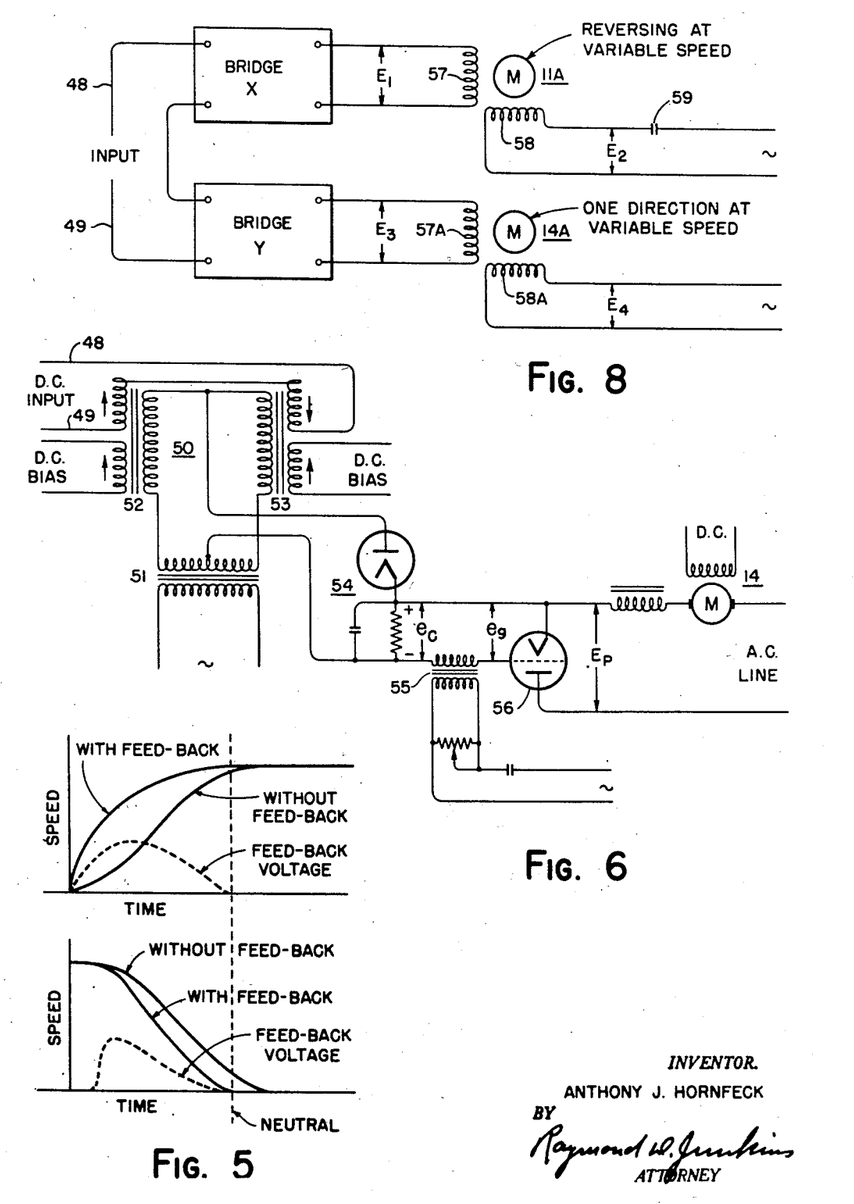
Fig. 5 is a plot of motor speed vs. time for the motor of Fig. 2.
Fig. 6 is an electric circuit diagram of the longitudinal travel motor of Fig. 2.
Fig. 8 is an electric circuit diagram of simultaneous control of the two motors of Fig. 1.

In Fig. 6 I show the control circuit for controlling speed of the motor 14 to accomplish this desideratum. A balanceable network 50 includes a center tap alternating current transformer 51 and two saturable core reactors 52, 53. Each of the reactors has an A.-C. winding connected in loop circuit with the secondary of the transformer 51. The reactors additionally each have two direct current windings, one carrying the D.-C. input from conductors 48, 49 (Fig. 2), and the other being a direct current bias winding. In the drawing arrows indicate the fact that the direct current windings of the reactor 52 are additive, whereas those of reactor 53 are in opposition. Thus a variation in the D.-C. input is amplified in its effect upon the network 50.

As previously mentioned, a "neutral" condition exists when the tracer arm 22 is pressed in predetermined degree against the template 18 and the tool 10 is cutting the work piece 17 to a cylindrical form. Under this condition the motor 11 is not urging the tool transversely of the work piece, and desirably the motor 14 is rotating at its maximum speed. In other words, under "neutral" value of D.-C. input to the conductors 48, 49 I desire full speed rotation of the motor 14. For either an increase or decrease of D.-C. input through the conductors 48, 49 I desirably decrease the speed of the motor 14 toward zero. These conditions I have graphically plotted in Fig. 7.

Figure 7:
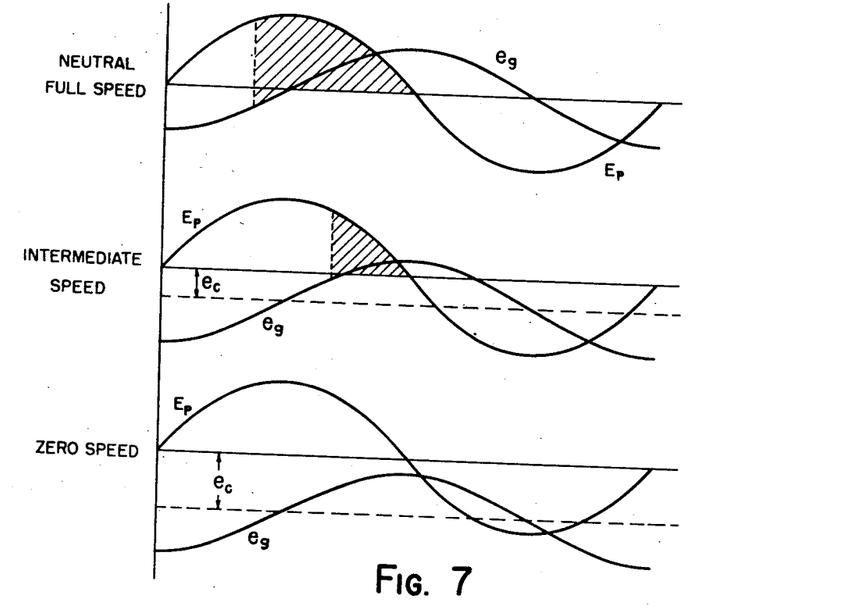
Fig. 7 is a graph in connection with Fig. 6.

In the circuit of Fig. 6 the bridge 50 is current sensitive, but departure of balance in either direction increases the direct current voltage $e_c$ output of a rectifier 54. Upon the D.-C. output $e_c$ I superimpose an alternating current from a transformer 55 90 degrees out of phase. The voltage $e_g$ is therefore equal to $e_c$ plus the superimposed out of phase alternating current voltage and $e_g$ is applied to the Thyratron 56 for control thereof. The plate voltage $E_p$ across the tube 56 passes through the armature of the motor 14 for speed control thereof. Referring to Fig. 7, the shaded portion of the graph indicates the band of conductance of the tube 56, from which it will be seen that as $e_c$ increases the conductance of the tube 56 decreases until it fails to turn on at all and the motor 14 has zero speed.

From the above it will be apparent that as the D.-C. input to the conductors 48, 49 varies in either direction from the "neutral" value, the conductance of the tube 56 decreases and the speed of the motor 14 decreases from a "neutral" maximum speed. While I have shown the control circuit for the motor 11 in Fig. 2, and that for the motor 14 in Fig. 6, it is to be understood that the two circuits might have been shown in a single figure of the drawing.

In Fig. 8 I do show schematically the control of a motor 11A reversible at variable speed and a motor 14A operating in one direction at variable speed, both simultaneously from the D.-C. input through conductors 48, 49. The motors 11A and 14A are alternating current type motors, and a particular feature of my invention is that the control of speed is entirely by phase shift or amount of lead or lag in phase relative to the line, and wherein the voltage tends to remain constant. Thus the motor speed control in accordance with my invention is by phase shift rather than by magnitude of voltage or current. The alternating current voltages $E_1$ and $E_3$ have voltage values remaining substantially proportional to line voltage. The phase, however, of $E_1$ and of $E_3$ is shifted by the bridges X and Y respectively simultaneously and in the same direction and amount.

Figure 9:
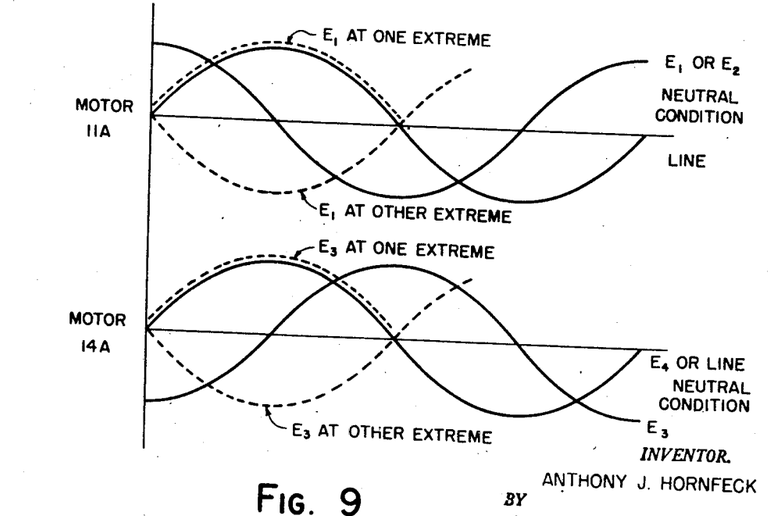
Fig. 9 is a graph of conditions in Fig. 8.

Referring to Fig. 9, wherein I plot phase conditions of the voltages in connection with motors 11A and 14A, it will be noted that the solid curves represent phase conditions under "neutral" condition of D.-C. input through the conductors 48, 49, whereas the dotted lines show voltage phase conditions at the extremes of phase shift either way from the neutral. It is a characteristic of the circuit that the phase shift will not be over 90 degrees either way from neutral. It will be observed that the motor 11A has a winding 57 connected across $E_1$ and at 90 electrical degrees thereto a winding 58 connected in series with a capacitor 59 and across $E_2$. The motor 14A has similar windings 57A, 58A 90 electrical degrees apart, but does not have the capacitor 59.

Referring to the uppermost graph of Fig. 9 which is representative of conditions appurtenant to motor 11A, it will be observed that under the neutral condition of D.-C. input to the conductors 48, 49 $E_1$ and $E_2$ are in phase with each other for zero motor speed and are 90 degrees out of phase with the line voltage due to the effect of capacitor 59 on voltage $E_2$. Voltage $E_1$ can be shifted by bridge X to be in phase with the line or 180° out of phase with the line, i. e. it leads or lags $E_2$ by 90 degrees as an extreme. Intermediate phase relation between $E_1$ and $E_2$ determines not only the direction but also the speed of rotation of the motor 11A.

Under neutral conditions $E_4$ is in phase with the line and $E_3$ is 90 degrees out of phase with both the line and $E_4$. This means that under neutral condition the motor 14A is rotating at its maximum speed. Shifting of the phase of $E_3$ 90 degrees either way from the neutral condition means that for one direction of phase shift $E_3$ will approach in-phase relation to $E_4$ and the motor armature will approach zero speed. Under the other extreme of phase shift $E_3$ will approach 180 degrees out-of-phase with $E_4$ and the motor armature will approach zero speed of rotation. Thus from a neutral condition wherein motor 14A is rotating at maximum speed the speed will be decreased upon any shift in phase of $E_3$ in either direction relative to $E_4$, and the speed variation between maximum and zero will depend upon the degree of phase shift.

The bridges X and Y of Fig. 8 are of the type designated 26 in Fig. 2 without, however, in this case having the feedbacks at 46, 47.

Up to the present I have been describing what I term a 2-element control of a lathe, namely, control of transverse motion of the tool and of longitudinal movement of the tool. For certain operations it may be desirable to provide a 3-element control of the lathe, namely, to include with the control of transverse and longitudinal movement of the tool a control of speed of rotation of the work piece relative to the tool. This so that cutting speed of the tool may be held constant, i. e. the speed of rotation of the work when cutting at one diameter to be proportionally greater or lesser than the speed of rotation when cutting at a different diameter. To accomplish such control I provide for rotating the work piece 17 through the necessary gears 60 by means of a motor 61 similar to the motor 14A and controlled in similar manner insofar as unitary directional rotation is concerned. In other words, the motor 61 would rotate normally in a single direction, but its speed of rotation would depend upon the transverse position of the tool 10, and consequently upon the diameter of the work piece to which the tool were cutting.

For dictating to the control circuit of motor 61 the transverse position of the tool 10 I provide a cam 62 (Fig. 1) fastened to and carried by the cross-slide 8 in its transverse positioning relative to the work piece 17. Fixed to the carriage 7 is a tracer assembly 63 having its contact arm engaging the profile of the cam 62. Thus as the cross-slide 8 is positioned toward or away from the axis of the work piece 17 the cam surface 62 would engage in greater or lesser extent the tracer 63 for control of speed of rotation of the motor 61 rotating the work piece 17. The electrical control of the motor 61 through the agency of the tracer 63 is similar to that described in connection with Fig. 6, so that it does not appear necessary to duplicate the drawing and description.

Figure 10:
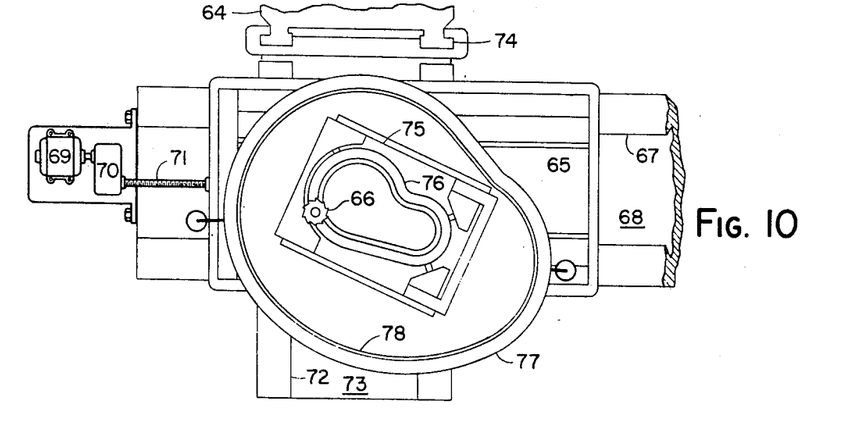
Fig. 10 is a plan view of a portion of a vertical milling machine.

My invention is equally applicable to other types of machine tools or material working machines, and in that connection I will now describe my invention as applied to a vertical milling machine. In Fig. 10 I show a view looking down on a vertical milling machine having a column 64, a work table 65, and a rotatable form milling cutter 66. The work table 65 is movable along ways 67 on a saddle 68 through the agency of a motor 69, gear reduction 70 and screw 71. The saddle 68 is positionable along horizontal guideways 72 of a knee 73 which is supported in vertical guideways 74 formed on the column 64. The cutter 66 while rotating is normally in fixed axial position. On the work table 65 is a rotatable work holder 75.

At 76 is shown a typical work piece consisting of a concave forging of more or less elliptical shape and in rough form having a raised blank face extending around its entire periphery. The machining operation which I have chosen as illustrating my invention includes forming a male flange face on this blank face. The cutter 66 is suitably shaped to relieve the outer edge of the flange and by my invention the work piece is automatically moved along the guideways 67, while the work 76 is being rotated, so that the cutter accurately forms the outer profile of the raised portion of the flange.

The work piece 76 is shown as being secured to the work holder 75 by common clamping means. The machining of the work piece 76 is completed in one revolution of the work holder 75 during the revolution of the work piece, it being moved relative to the cutter 66 along the guideways 67. The work holder 75 has a horizontally extending skirt 77 forming a cam or template, the contour of which is formed to produce the desired contour of the raised portion of the flange on the work piece 76. A raised barrier 78 is preferably employed to hold chips cut from the work piece from scattering.

Supported by the saddle 68 is a tracer assembly 79 having a tracer arm 80 engaging the periphery of the cam 77. The device 79, 80 controls the motor 69 which drives through the gear 70 and lead screw 71 for horizontally positioning the work table 65 along the ways 67. Through engagement of the tracer arm 80 with the periphery of the cam 77 the motor 69 is energized to position the work piece 76 and cam 77 transversely in either direction relative to the axially stationary milling cutter 66.

Figure 11:
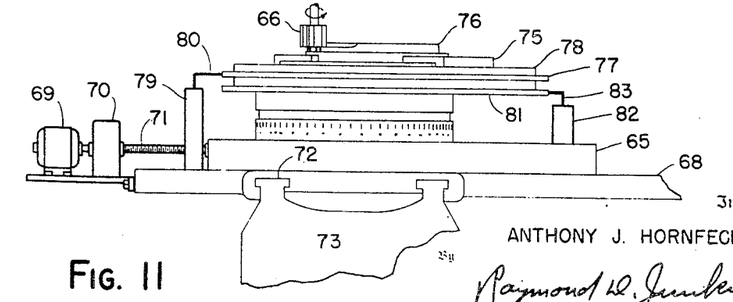
Fig. 11 is an elevation of the vertical milling machine of Fig. 10.

In Fig. 11 I show an elevation of a portion of the milling machine of Fig. 10. I provide a second cam or template 81 rotatable with the work holder 75, the work 76, and the cam 77. Engaging the cam 81 is the contact arm 83 of a tracer 82 mounted on the non-rotatable table 65. The tracer 82, 83 is, however, movable along the ways 67 of the saddle 68 with the rotatable and the non-rotatable portions of the work table 65. A motor (not shown) for rotating the rotatable portion of the work table 65 is movable along the ways 67 with the entire work table assembly. Such motor is controlled by the tracer 82, 83 in engagement with the cam 81 and functions to provide a speed of rotation of the work piece 76 depending upon the cam profile 81.

In general the arrangement is such that the cam 77 provides the transverse movement of the work 76 relative to the cutter 66, and while the work 76 is making one complete revolution. The cam 81 functions to determine the speed of rotation of the work 76 relative to the cutter 66 during the single revolution of the work piece. The motors under the control of the tracer 79, 80 and the tracer 82, 83 are of the type described and controlled similar to motors 11 and 14 respectively of Fig. 1. The tracer 79 may be similar to the tracer 20, of Figure 2, and control a bridge similar to the bridge 26. This bridge in turn may control oppositely connected tubes similar to tubes A and B of Figure 2. The output of these tubes will control the motor 69, both as to direction and speed of rotation. Such control of the motor 69 will, of course, reciprocably position the worktable 65 to determine the shape of the workpiece 76. The tracer 82 may be similar to the tracer 20 and control a circuit similar to the circuit of Figure 6. Thus the motor controlled by tracer 82 will be variable in speed in a single direction, and hence the speed of rotation of the workpiece 76 may be varied in accordance with the template 81 to take into account the slower speed desired during movement of the worktable 65.

Figure 12:
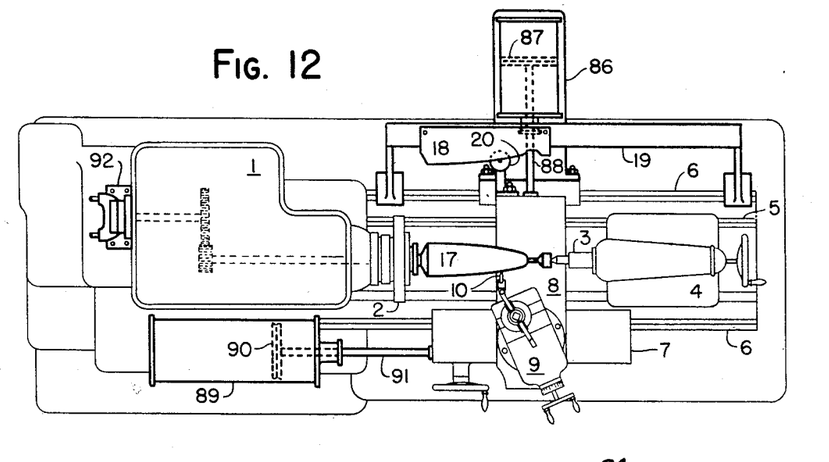
Fig. 12 is a plan view of a lathe similar to Fig. 1, but including another embodiment of my invention.
Figures 13, 14:
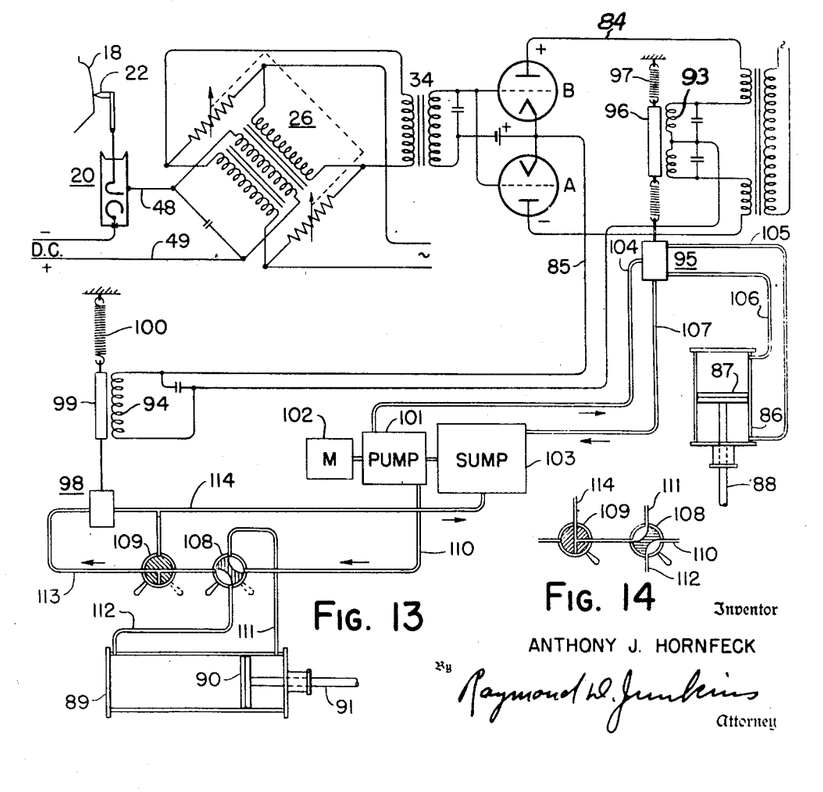
Fig. 13 is a diagrammatic showing of the control for the lathe of Fig. 12.
Fig. 14 is a switching valve arrangement.

In Figs. 12, 13 and 14 I illustrate a further embodiment of my invention wherein the lathe cutting tool 10 is positioned transversely relative to the work 17 through the agency of a hydraulic motor comprising a cylinder 86 and piston 87, the latter positioning the cross-slide 8 through the agency of a piston rod 88. The tool 10 is positioned longitudinally along the work 17 through the agency of a cylinder 89, piston 90 and piston rod 91. For rotating the work piece 17 I provide a hydraulic or fluid pressure motor 92.

In Fig. 13 I illustrate that the control of the tool is a combination of electrical and hydraulic operation. The tracer assembly 20 (as in Fig. 2) controls a current sensitive bridge 26, which in turn selectively controls the output of the tubes A and B to the conductors 84, 85. Connected in series in the conductor 84 are solenoid windings 93, 94.

For control of the hydraulic motor 86 I provide an oil pilot valve 95, whose movable element is positioned by and with the solenoid core 96 against the bias of a spring 97 and under the influence of the solenoid winding 93. For positioning of the hydraulic motor 89 I provide a variable fluid resistance 98 whose movable element is positioned by and with a solenoid core 99 against the bias of a spring 100 and under the influence of the solenoid winding 94. The pilot valve 95 and the adjustable fluid resistance 98 may be of the type disclosed and claimed in the patent of Clarence Johnson, number 2,372,426, issued March 27, 1945.

I show an oil pump 101 driven by a motor 102 and drawing its supply of oil from a sump 103. Oil under pressure is supplied the pilot valve 95 by the pump 101 through a pipe 104. From the pilot valve 95 oil is supplied to one end or the other of the hydraulic motor 86 through the pipe 105 or 106. Drainage from the pilot 95 is returned to the sump 103 through a pipe 107.

In connection with the hydraulic motor 89 and adjustable resistance 98 I provide switching valves 108, 109 arranged to be moved together to either a "normal" or a "rapid traverse" position of operation for the hydraulic motor 89. The valves 108, 109 are shown in Fig. 13 in the "normal" operating position. Oil under pressure from the pump 101 is forced through the pipe 110, the valve 108 and the pipe 111 to one end of the cylinder 89. Oil from the other end of the cylinder 89 passes through a pipe 112, the valve 108, the valve 109, a pipe 113, the adjustable resistance 98 and a pipe 114 to the sump. The regulation of the variable resistance 98 for any displacement of the core 99 from neutral determines the rate of flow of oil through the pipe 112 and consequently the rate of travel of the piston rod 91 toward the left in the drawing of Fig. 13. Thus the rate of longitudinal travel of the tool 10 along the work piece 17 is controlled by the variable resistance of 98 to passage of oil therethrough from the left-hand end of the cylinder 89.

In Fig. 14 I show the passage relation of the switching valves 108, 109 for a "rapid return" of the piston rod 91 from left to right in Fig. 14. That is, for a rapid return of the tool 10 to the beginning of its working travel. In such position of the valves 108, 109 oil from the pump 101 passes directly through the pipe 110, the valve 108 and the pipe 112; while oil from the right-hand end of the cylinder 89 passes directly through the pipe 111, the valve 108, the valve 109, the pipe 114 to the sump. Thus on the rapid return of the piston rod 91 there is no throttling of its speed of travel by the variable resistance 98, and thus the tool is traversed to the right at maximum speed.

In general, the operation of the system is as follows. Under what I have previously termed a "neutral" condition wherein the tracer arm 22 is deflected slightly in bearing against the edge of the template 18 there will be a predetermined energization of the solenoid windings 93, 94. Adjustment of the springs 97, 100 in relation to this predetermined energization results in a position of the moving parts of the relay 95, and of the fluid resistance 98, such that a "neutral" or normal condition persists. Under this condition the pilot 95 is locked against the pipes 105, 106 so that there is no motion of the piston rod 88. At the same time the movable part of the fluid resistance 98 is in its position of allowing the greatest leakage of oil from the cylinder 89, and thus maximum speed of travel of the piston rod 91. This is a condition which would exist if the tool 10 is cutting a cylindrical form on the work piece 17. Upon change in shape of the template 18, the energization of the windings 93, 94 is correspondingly changed in amount and direction to vary the direction of travel of the piston rod 88 and the speed of travel of both piston rods 88 and 91.

Figure 15:
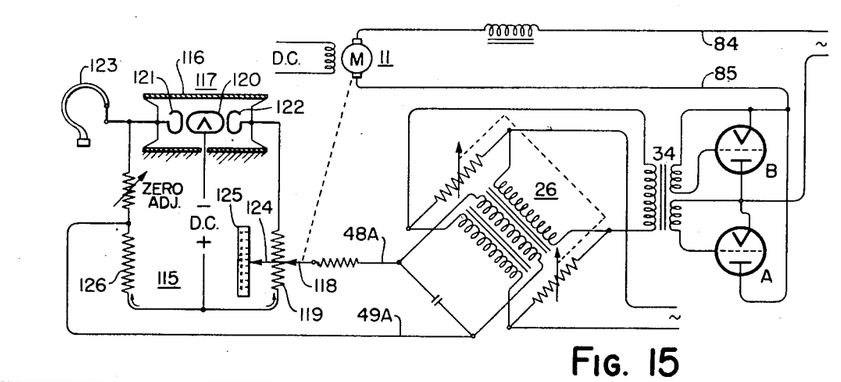
Fig. 15 is a wiring diagram of a measuring circuit.

In Fig. 15 I illustrate a measuring circuit employing the phase sensitive network 26 of Fig. 2 controlling a direct current type motor 11 through the agency of control tubes A and B. The network 26 receives direct current input through the conductors 48A and 49A from a balanceable network 115.

Whereas, in Fig. 2, I have illustrated the variable area electron discharge device 20 as having its anode 24 positionable by the tracer arm 22 and the envelope 21 being moved with the cross-slide 8 for follow-up; I herein indicate that the envelope 116 of the electron discharge device 117 is fixed and that the follow-up or balancing of the network 115 is accomplished through the movement of a contact arm 118 over a resistance 119. The envelope 116 contains a stationary cathode 120, a stationary anode 122, and a movable anode 121; the latter positioned through the agency of a Bourdon tube 123, which may be subjected to a pressure or temperature condition. The Bourdon tube 123 is representative only of any measuring device sensitive to the value of some variable, such as temperature, pressure, flow, position, movement, or the like, and whose magnitude or change in magnitude is desirably to be continuously indicated as by the index 124 relative to the scale 125. It is, of course, possible to have the anode 121 moved by a tracer arm (such as 22). The particular feature of the circuit in Fig. 15 is in the control of the motor 11 with an electrical balance of the system, rather than by mechanically positioning the envelope 116; in comparison to the system described in connection with Fig. 2.

Furthermore, the network 115 of Fig. 15 provides a reference arrangement compensating for any variations in emission of the device 117, variations in the electrical characteristics of the direct current source, etc. The direct current source is connected directly to the stationary cathode 120 and the emission across 120—122 provides the reference compensating the network 115 just mentioned relative to the emission across 120—121, which is controllable by movement of the Bourdon spring 123.

In operation, when pressure within the Bourdon tube 123 changes, then the position of 121 relative to 120 is varied, thus varying the electrical values within the loop including the members 120, 121, 126 and the D.-C. source. This loop becomes unbalanced in relation to the previous balance with the loop comprising 120, 122, 119 and the source. The direction and extent of unbalance is effective through the conductors 48A, 49A to control the phase sensitive bridge 26, and thereby control the direction and speed of rotation of the motor 11. The motor 11 is connected to position the contact arm 118 over the resistance 119 for again balancing the network 115, and at the same time the motor positions the pointer 124 relative to the scale 125 to provide an indication of the pressure or other variable to which the device 123 is sensitive.

Figure 16:
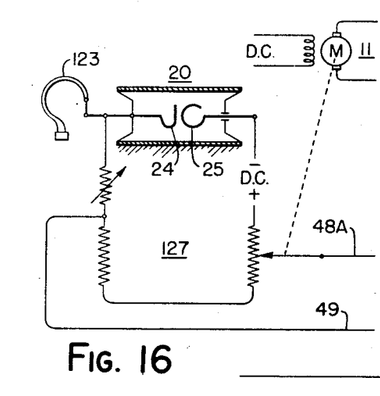
Fig. 16 shows a modification of a portion of the circuit of Fig. 15.

In Fig. 16 I show a network 127 for energizing the conductors 48A, 49A (Fig. 15) without providing the reference compensating portion of the circuit, Fig. 15. The electron device 20 has a single cathode 25 and an anode 24.

Figure 17:
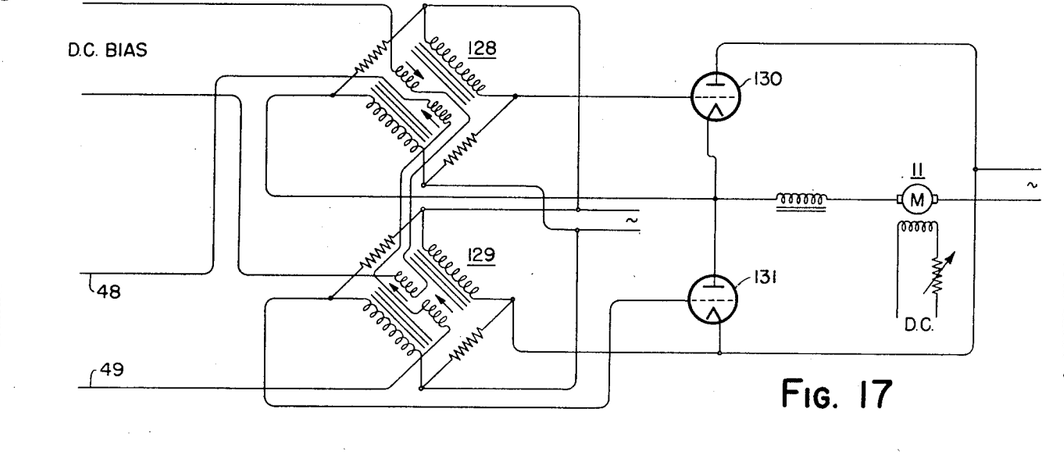
Fig. 17 is a motor control circuit.

In Fig. 17 I show a circuit for the control of a motor 11 from a D.-C. input over conductors 48, 49 and employing two phase sensitive bridges 128, 129 for control of the electron devices 130, 131, which may be Thyratrons to control larger direct current motors than those shown in Fig. 2

The bridges 128, 129 are similar to each other and in general are similar to the bridge 26 of Fig. 2. Each bridge has a saturable core reactor, but in bridges 128 and 129 there is a direct current bias applied to a winding of each reactor in addition to the direct current control winding. In bridge 128 the bias is opposing the control winding whereas in bridge 129 it is additive. Inasmuch as the bias is equal in the two bridges, the current across conductors 48, 49 is zero at a balanced condition with the motor 11 not rotating. Under this condition the reactors are equally saturated by the common bias current. Unbalance of the supply to 48, 49 in one direction produces increased saturation of bridge 128 and decreased saturation of bridge 129. This produces a grid voltage on tube 130 more nearly in phase with its plate and less in phase on the plate of tube 131. Reversal of the direct current supply to 48, 49 produces an opposite effect.

While I have chosen to illustrate and describe certain preferred embodiments of my invention, it will be understood that my invention is applicable to many other problems and that I am not to be limited to the embodiments described.

What I claim as new, and desire to secure by Letters Patent of the United States, is:

1. A measuring system for indicating a variable such as a position or value including in combination, a balanceable direct current circuit, means positioned representative of the variable for disturbing the balance of the circuit, a phase shifting network controlled by the direct current output of said circuit, said network including opposite reactance arms on a saturable core reactor structure, electron discharge means selectively controlled by phase values of network output voltage, a motor connected to said discharge means and whose direction and speed of rotation is controlled by the electron discharge means, and balancing means in said circuit positioned by the motor as a measure of the variable.

2. The system of claim 1 including reference circuit means compensating for disturbing electrical characteristics of the direct current balanceable circuit.

3. A motor control circuit including two phase shifting alternating current bridges each including a saturable core reactor, said bridges each having opposite reactance arms on said reactor, a substantially constant direct current bias for each of said reactors, a variable source of direct current as a control to each of said reactors, the variable control direct current additive with the bias on one reactor and opposing on the other, electron discharge means selectively controlled by the phase of the output voltages from the bridges, and a motor connected to said discharge means and controlled as to direction and speed of rotation by the electron discharge devices.

4. In an electrical system for maintaining a given energization condition of a power utilizing device, a unidirectional variable current passing device to cause variable energization of said power utilizing device, a controllable phase shift bridge having an output voltage for controlling the current passed to said power utilizing device by said unidirectional variable current passing device, means for energizing said bridge from an A. C. source, two opposite reactance arms in said bridge, a saturable core for said reactance arms, control winding means for effecting varying degrees of saturation of said saturable core to shift the phase of the bridge output voltage relative to said A. C. source and hence the energization of said power utilizing device, excitation means for exciting said control winding means at a first condition of excitation corresponding to the given energization condition of said power utilizing device, unbalancing means for changing the excitation on said control winding means to shift the phase of said bridge output voltage for varying the energization condition of said power utilizing device, and mechanical linkage means connected between said device and said unbalancing means and responsive to the change of energization of said power utilizing device for at least retarding the effect of said unbalancing means.

5. In an electrical system for tending to maintain a constant velocity of rotation of a motor, a thermionic tube to cause variable energization of said motor, a phase shift network connected to said tube and having an output voltage for controlling the current passed to said motor by said tube, means for energizing said network from an A. C. source, two opposite reactance arms in said network, a saturable core for said arms, control winding means for effecting varying degrees of saturation of said saturable core to shift the phase of the network output voltage relative to said A. C. source and hence vary the rotational speed of said motor, excitation means for exciting said control winding means at a given condition of excitation corresponding to said constant velocity of rotation of said motor, unbalancing means for changing the excitation on said control winding means to shift the phase of said network output voltage for varying the rotational velocity of said motor, and mechanical linkage means connected between said motor and said unbalancing means and responsive to the movement of said motor for at least retarding the effect of said unbalancing means.

6. A motor control circuit including in combination an alternating current network comprising a bridge having opposite resistance arms and opposite reactance arms, the reactance arms included in a saturable core reactor structure, a direct current control winding for the reactor for varying the impedance of the reactance arms, a source of alternating current voltage for the network, an alternating current output circuit from the network to deliver a substantially constant network output voltage shiftable in phase relative to the phase of the said source by variation in the amount of direct current supplied to said control winding, a pair of opposedly connected discharge devices selectively controlled by the phase of the network output voltage, and a motor connected to said devices and whose rotation is controlled by the output voltages of the pair of discharge devices.

7. A motor control circuit including in combination an alternating current network comprising a bridge having opposite resistance arms and opposite reactance arms, the reactance arms included in a saturable core reactor structure, a direct current control winding for the reactor for varying the impedance of the reactance arms, a source of alternating current voltage for the network, an alternating current output circuit from the network to deliver a substantially constant network output voltage shiftable in phase relative to the phase of the said source by variation in the amount of direct current supplied to said control winding, a pair of opposedly connected discharge devices selectively controlled by the phase of the network output voltage, a motor connected to said devices and whose rotation is controlled by the output voltages of the pair of discharge devices, and means controlled by the rotation of said motor for varying the degree of energization of said direct current winding.

8. In an electrical system for establishing a given balanced energization condition of a power utilizing device, a controllable phase shift bridge having an output voltage for controlling the current passed to said power utilizing device, means for energizing said bridge from an alternating current source, two opposite reactance arms in said bridge, a saturable core for said reactance arms, control winding means for effecting varying degrees of saturation of said saturable core to shift the phase of the bridge output voltage relative to said alternating current source and hence the energization of said power utilizing device, excitation means for exciting said control winding means at a balance condition of excitation corresponding to the balanced energization condition of said power utilizing device, and unbalancing means for changing the excitation on said control winding means to shift the phase of said bridge output voltage for varying the energization condition of said power utilizing device.

9. In an electrical system for maintaining a given balanced energization condition of a power utilizing device, a controllable phase shift bridge having an output voltage for controlling the current passed to said power utilizing device, means for energizing said bridge from an alternating current source, two opposite reactance arms in said bridge, a saturable core for said reactance arms, control winding means for effecting varying degrees of saturation of said saturable core to shift the phase of the bridge output voltage relative to said alternating current source and hence the energization of said power utilizing device, excitation means for exciting said control winding means at a balance condition of excitation corresponding to the balanced energization condition of said power utilizing device, unbalancing means for changing the excitation on said control winding means to shift the phase of said bridge output voltage for varying the energization condition of said power utilizing device, and mechanical linkage means responsive to the change of energization of said power utilizing device and connected to said unbalancing means for at least retarding the effect of said unbalancing means.

10. In an electrical system for tending to maintain a constant velocity of a motor, a phase shift network having an output voltage for controlling the current passed to said motor, means for energizing said network from an alternating current source, two opposite reactance arms in said network, a saturable core for said arms, control winding means for effecting varying degrees of saturation of said saturable core to shift the phase of the network output voltage relative to said alternating current source and hence vary the speed of said motor, excitation means for exciting said control winding means at a balance condition of excitation corresponding to said constant velocity of said motor, unbalancing means for changing the excitation on said control winding means to shift the phase of said bridge output voltage for varying the velocity of said motor, and mechanical linkage means responsive to the change of velocity of said motor and connected to said unbalancing means for varying said excitation means in a direction to at least retard the effect of said unbalancing means.

11. A motor control circuit including in combination, a phase shifting network having a substantially constant value output voltage of adjustable phase relative to the phase of the alternating current voltage supply to the network, said network including two opposite reactance arms, a saturable core for said reactance arms, an adjustable direct current control for the network for effecting varying degrees of saturation of said saturable core, a pair of opposedly connected electron discharge devices selectively controlled by the phase of the network output voltage, and a motor connected to said devices and whose rotation is controlled by the output voltage of the pair of electron devices.

12. A motor control circuit including in combination, a phase shifting network bridge having a substantially constant value output voltage of adjustable phase relative to the phase of the alternating current voltage supply to the network, said bridge including opposite reactance arms on a single saturable core structure, an adjustable direct current control for effecting varying degrees of saturation of said saturable core structure, a pair of opposedly connected electron discharge devices selectively controlled by the phase of the network output voltage, and a motor connected to said devices and whose direction and speed of movement is controlled by the output of the electron devices.

13. A motor control circuit including in combination, a phase shifting network having an output voltage of adjustable phase relative to the phase of the alternating current voltage supply to the network, said network including two opposite reactance arms, a saturable core for said reactance arms, direct current control means in said network to effect varying degrees of saturation of said saturable core for adjusting the phase of its output voltage, electron discharge means selectively controlled by the phase of the network output voltage, and a motor connected to said electron discharge means and whose speed is controlled by said electron discharge means.

14. The circuit of claim 13 including means sensitive to a variable for varying the direct current.

15. The circuit of claim 14 wherein the motor is a shunt wound direct current type having a direct current energized field and having an armature receiving pulsating direct current from the electron discharge means.

16. The circuit of claim 14 including a feedback circuit from the motor to the direct current control means imposing thereon a feedback voltage representative of rate of change in motor speed.

17. The circuit of claim 14 including an antihunt feedback circuit from the motor to the direct current control means imposing thereon a feedback voltage only when motor speed is changing.

18. A motor control circuit including in combination, a phase shifting network having a substantially constant value output voltage of adjustable phase relative to the phase of the alternating current voltage supply to the network, said network including two opposite reactance arms, a saturable core for said reactance arms, direct current control means delivering direct current of changeable potential to effect varying degrees of saturation of said saturable core for adjusting the phase of its output voltage, electron discharge means selectively controlled by the phase of the network output voltage, and a motor connected to said electron discharge means and controlled by said electron discharge means.

ANTHONY J. HORNFECK.

REFERENCES CITED

The following references are of record in the file of this patent:

UNITED STATES PATENTS

| Number | Name | Date |
| --- | --- | --- |
| 1,901,694 | Bedford | Mar. 14, 1933 |
| 1,926,275 | FitzGerald | Sept. 12, 1933 |
| 2,025,748 | Howe | Dec. 31, 1935 |
| 2,027,140 | Alexanderson | Jan. 7, 1936 |
| 2,085,595 | Livingston | June 29, 1937 |
| 2,112,682 | Ryder | Mar. 29, 1938 |
| 2,116,593 | Bouvier et al. | May 10, 1938 |
| 2,175,009 | Anderson | Oct. 3, 1939 |
| 2,288,295 | Moyer et al. | June 30, 1942 |
| 2,315,602 | Dawson | Apr. 6, 1943 |